United States Patent
Herz

(10) Patent No.: US 7,689,746 B2
(45) Date of Patent: Mar. 30, 2010

(54) BUS SYSTEM EMPLOYING AN ARBITER

(75) Inventor: Karl Herz, Munich (DE)

(73) Assignee: Infineon Technologies AG, Neubiberg (DE)

( * ) Notice: Subject to any disclaimer, the term of this patent is extended or adjusted under 35 U.S.C. 154(b) by 281 days.

(21) Appl. No.: 11/678,872

(22) Filed: Feb. 26, 2007

(65) Prior Publication Data

US 2007/0204081 A1    Aug. 30, 2007

(30) Foreign Application Priority Data

Feb. 27, 2006    (DE) .................... 10 2006 009 034

(51) Int. Cl.
*G06F 13/00* (2006.01)
(52) U.S. Cl. ..................... 710/110; 710/309
(58) Field of Classification Search ......... 710/110–119, 710/240–244, 36–40, 107, 306–209
See application file for complete search history.

(56) References Cited

U.S. PATENT DOCUMENTS

| | | | |
|---|---|---|---|
| 6,467,002 B1 * | 10/2002 | Yang ........................ | 710/116 |
| 6,823,410 B2 * | 11/2004 | Koike ........................ | 710/107 |
| 7,024,506 B1 * | 4/2006 | Harrington ................ | 710/243 |
| 7,032,046 B2 * | 4/2006 | Horii et al. ................ | 710/113 |
| 7,051,133 B2 * | 5/2006 | Takata ........................ | 710/111 |

FOREIGN PATENT DOCUMENTS

DE    10 2004 013 635    10/2005
EP     1 220 103          11/2003

* cited by examiner

*Primary Examiner*—Raymond N Phan
(74) *Attorney, Agent, or Firm*—Dicke, Billig & Czaja, PLLC

(57) ABSTRACT

A method for operating a bus system, in particular in a microprocessor or microcontroller, and a semiconductor device for performing the method is disclosed. In one embodiment, for optimizing the order of accesses to the bus system, a method for operating a bus system includes at least one transmission channel, wherein the transmission channel connects at least two masters and at least one slave with one another. The masters are connected with an arbiter determining the order of accesses in which the masters access the transmission channel. The method provides that the arbiter takes into account meta information about planned accesses when determining the order of accesses. Meta information can further be stored and be referred to for subsequent determinations.

20 Claims, 2 Drawing Sheets

BUS SYSTEM EMPLOYING AN ARBITER

CROSS-REFERENCE TO RELATED APPLICATIONS

This Utility Patent Application claims priority to German Patent Application No. DE 10 2006 009 034.9 filed on Feb. 27, 2006, which is incorporated herein by reference.

BACKGROUND

The invention relates to a method for operating a bus system, in particular in a microprocessor or a microcontroller. Furthermore, the invention relates to a semiconductor device that is suited to perform the method.

In electric or electronic systems, individual system modules communicate via a transmission medium. The system modules may be different electronic devices arranged in a respective component, for instance, different semiconductor devices arranged in a single component. Furthermore, they may be different device sub-components, in particular different components of a semiconductor device, e.g., a memory and/or computing circuit, e.g., a microcontroller or microprocessor, provided in one single device. The transmission medium may, for instance, be a bus or a switch system.

A bus or switch system may connect a plurality of devices or components that use the bus or switch system jointly.

Conventional bus or switch systems may consist of one or several partial systems, for instance, of a data bus for transmitting the actual payload, and/or a control bus for transmitting control data, and/or an address bus for transmitting address data. The data bus as well as the control bus and address bus may include one or several physical data lines each.

A bus or switch system may thus include several transmission channels for the transmission of data, wherein a transmission channel can only be used by one of the connected devices at a time.

In the following, such a transmission channel, via which, for instance, payload or control data or address data can be transmitted and which only one connected device can access at a time, will be referred to as a bus. A system that permits the simultaneous, i.e. temporally parallel transmission of similar data via corresponding transmission channels will be referred to as a switch.

A switch system may thus be formed by a plurality of parallel busses.

If a plurality of system modules are connected with each other via a bus, they act either as a master or as a slave. A master is a system module that is adapted to start a communication on a bus and to actively access the bus to this end. A slave receives such communication or responds to it, is, however, not adapted to start it independently—without being requested. If, for instance, a processor and a memory are connected with each other via a bus, the processor requests, when making a read access to the memory, the memory to provide data. The memory accepts this request and performs the read access and provides the desired data. The processor acts as a master starting the read access, and the memory acts as a slave accepting and performing the read access.

In data processing or control systems, in particular in computer as well as in microprocessor and microcontroller systems, several system modules may be connected with each other via a bus, wherein more than one system module acts as a master. If several masters simultaneously access the bus in an uncoordinated manner to communicate with one or several slaves, they interfere with each other.

Thus, there is the need to coordinate the accesses of the masters such that mutual interferences of the masters are prevented by only one master accessing the bus at a time.

The accesses to a bus are coordinated by an arbiter that is connected with every system module acting as a master and is adapted to exchange data therewith.

In accordance with a conventional method, the arbiter may grant the access permission, for instance, in turns, i.e. pursuant to a round-robin method, to the masters, so that all masters are successively given the possibility of accessing the bus, even if no necessity of access exists for them.

In accordance with a further conventional method, the arbiter may use different information for determining the order of access to the bus. For evaluation of the information, the arbiter includes the logic required for determining the order or access.

Before a master is capable of accessing the bus, this master has to communicate the desired access to the arbiter. In the case of competing accesses to the bus, the arbiter determines the order of accesses and informs a master when it is permitted to access the bus for performing the desired action.

In accordance with a further conventional method, priorities may be assigned to the masters, so that, in the case of simultaneous and thus competing accesses it is always the master with the higher priority that is permitted to access the bus.

In complex bus or switch systems, these methods do, however, not enable an optimum order for competing accesses to a bus, so that they can be performed as quickly as possible and the bus or switch system is utilized as optimally as possible.

One embodiment of the invention provides an improved method for determining the order of access in the case of competing accesses to a bus or switch system.

For these and other reasons, there is a need for the present invention.

SUMMARY

One embodiment provides a method for operating a bus system. The bus system is defined to include at least one transmission channel, at least two masters, and at least one slave connecting, at least two masters and at least one slave with one another via the transmission channel. An arbiter is coupled to the at least two masters, and configured to determine the order of accesses in which the at least two masters access the transmission channel, using at least one meta information about at least one access when determining the order of accesses.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
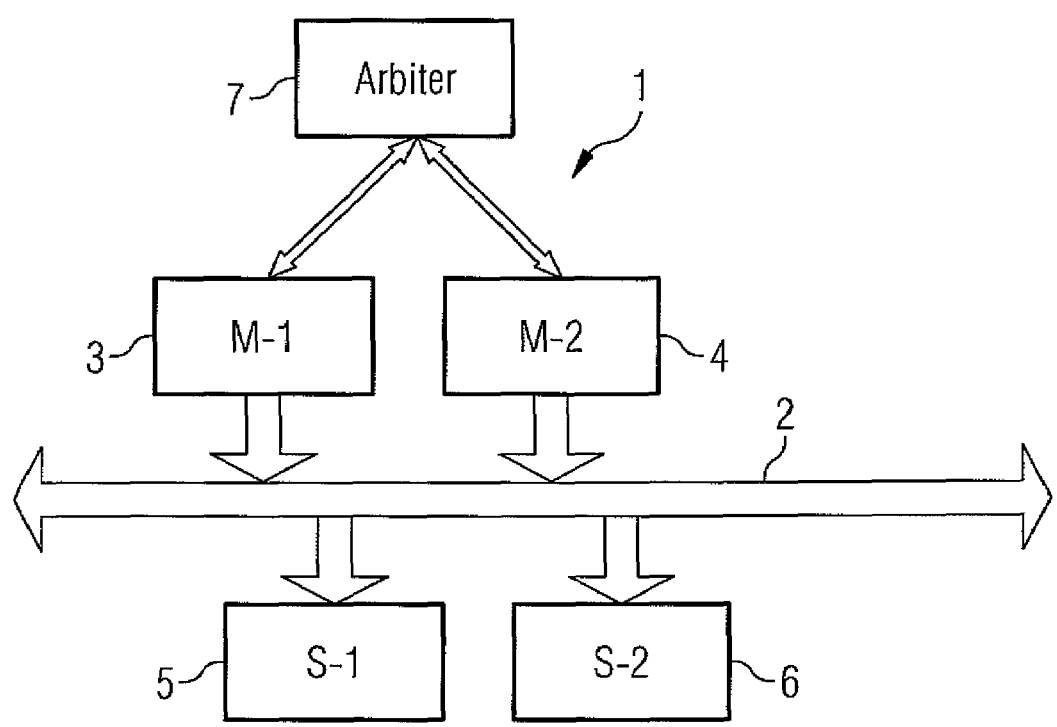
FIG. 1 illustrates a simplified block diagram of a master-slave communication system.

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In accordance with one embodiment of the invention there is a method for operating a bus system having at least one transmission channel, wherein the transmission channel connects at least two masters and at least one slave with one another, and wherein the masters are connected with an arbiter that determines the order of access according to which the masters access the transmission channel. When determining the order of access, the arbiter takes into account at least one meta information about at least one access.

A meta information about an access is here information about the access. Thus, a meta information describes or characterizes an access. Relevant meta information about an access is, for instance, the kind of access, i.e. whether it is the matter of a read or write or control access, or the target of the access, e.g., which slave that is connected with the transmission channel is to be accessed. Further meta information may indicate the amount of data to be transmitted with the access, or the—presumable—duration of a planned access.

The arbiter evaluates the meta information and determines whether, due to the order of the accesses, the accesses to be performed to the transmission channel can be performed more quickly altogether, and whether the transmission channel can be better utilized by an order of access that can be determined by itself.

The meta information is given to the arbiter by each master that is connected with the transmission channel. The arbiter can store the meta information and take stored meta information into account when subsequently determining an order of access.

In accordance with a further embodiment of the invention there is suggested a semiconductor device having at least one transmission channel for transmitting data, wherein the transmission channel connects at least two masters and one slave with one another, and an arbiter for determining an order of access for accesses to the transmission channel. In this semiconductor device, the masters are connected with the arbiter for transmitting meta information about an access.

Via the connection between the masters and the arbiter, the masters communicate a planned access to the transmission channel to the master, wherein meta information about a planned access is communicated to the arbiter. The arbiter thus receives information, for instance, about which master has to access which target, i.e. a slave, in which kind, e.g., by a write or a read or a control access. In the case of temporally competing accesses, the arbiter determines the meta information communicated, so as to determine an order of accesses with which the accesses can be performed successively as quickly as possible, and/or wherein the transmission channel is better utilized.

FIG. 1 illustrates a master-slave communication system 1. The bus 2 connects a first master 3, M-1, with a second master 4, M-2, and with a first slave 5, S-1, and a second slave 6, S-2.

In this embodiment, the bus 2 includes one transmission channel. In order to avoid mutual interferences, only one master can access this transmission channel at a time. The slaves 5, 6 do not actively access the bus 2 due to their property as slaves.

The first master 3 may, for instance, be a CPU, and the second master 4 a memory controller, e.g., a DMA controller. The first slave 5 may, for instance, be a serial interface, and the second slave 6 an interface to another bus system, for instance, a CAN interface (Controller Area Network).

All masters 3, 4 are further connected with an arbiter 7 to communicate or receive information to or from it.

The directions of the arrows representing the connections of the masters 3, 4 and the slaves 5, 6 with the bus and of the masters with the arbiter 7 indicate the direction in which a data exchange is triggered corresponding to the property as master or slave.

The open ends of the bus 2 indicate that it is adapted to connect further masters and/or further slaves.

In the instant embodiment, the first master 3 shall have a higher priority than the master 4, so that the master 3 is permitted to be the first to perform its access to the bus 2 in the case of temporally competing accesses of the masters 3, 4. Furthermore, it is assumed that the slaves 5, 6 require 3 clock cycles each for performing read and write accesses.

The slaves 5, 6 include a write buffer for performing write accesses. In the case of a write access of a master 3, 4, the data to be written are initially written into the write buffer by the slave, so that this action to the outside, i.e. on the bus, is terminated as soon as the data have been fully stored in the write buffer. The further storing of the data from the write buffer of the slaves to the final memory location takes place in a conventional manner within the slave. The bus 2 is thus released as soon as the data have been stored in the write buffer. Since it is assumed that the data to be written can be transmitted with one bus cycle, the bus 2 is only occupied for one cycle by a master 3, 4 during a write access. Correspondingly, a write access lasts one cycle for a master 3, 4.

For a read access it is assumed in the instant embodiment that the master 3, 4 waits until the slave 5, 6 has read the desired data and is able to transmit same to the master 3, 4 via the bus 2. For a read access, the bus 2 is thus occupied for a duration of 3 cycles.

To be able to access the bus 2 and thus a slave 5, 6, the two masters 3, 4 communicate an access request each to the arbiter via the respective communication.

In the instant embodiment, the first master 1 requires a read access to the first slave 5, the second master 4 requires a write access to the second slave 6.

In accordance with a conventional method for determining the order of accesses to the bus 2, the masters 3, 4 each communicate to the arbiter 7 that they have to access the bus, without, however, informing the arbiter of the kind of the desired access, i.e. whether it is a read or a write access, nor the target of the access. Due to the access priority of the first master 3, the arbiter 7 will permit the first master 3 to be the first to access the bus 2. As soon as the bus 2 is free again, the second master 4 may perform its write access to the slave 2. If the second master 4 requests another write access to the second slave 6, this may be performed subsequently to the first write access of the second master 4 to the second slave 6.

Table 1 illustrates the order and duration of these actions in accordance with the conventional method.

TABLE 1

| | Cycle | | | | | | | | |
|---|---|---|---|---|---|---|---|---|---|
| | 1 | 2 | 3 | 4 | 5 | 6 | 7 | 8 | 9 |
| M-1 | Read1 S-1 | Read1 S-1 | Read1 S-1 | | | | | | |
| M-2 | Write 1 S-2 | Write1 S-2 | Write1 S-2 | Write1 S-2 | Write2 S-2 | Write2 S-2 | Write2 S-2 | | |
| S-1 | Read1 | Read1 | Read1 | | | | | | |
| S-2 | | | | Write1 | Write1 | Write1 | Write2 | Write2 | Write2 |
| Bus | M-1 | M-1 | M-1 | M-2 | M-2 | M-2 | M-2 | | |

In the cycles 1 to 3, the first master 3, i.e. M-1, performs its read access, entered in the Table as "Read1 S-1", to the first slave 5, i.e. S-1. During these three cycles the bus 2 is accessed by the first master 3.

The write access of the second master 4, entered in Table 1 as "Write1 S-2", to the second slave 6 starts in the fourth cycle. Since the second write access of the second master (M-2) 4 to the second slave (S-2) 6 may only start when the first write access within the first slave 6 has been terminated, the second write access, entered in the Table 1 as "Write2 S-2", starts in the seventh cycle. Although the master 4 only requires one cycle for transmitting the data to be written to the second slave 6, the bus 2 remains, in the meantime in which the second master 4 waits that the second slave 6 terminates the first write access, accessed by the second master 4. All in all, the processing of this transaction thus lasts 7 bus clocks.

Unlike the afore-described conventional method, the masters—in accordance with the new method—not only communicate to the arbiter, when requesting access, that they have to access the bus 2, but they also inform it about the kind of the access and which slave will be the target of the access. The arbiter 7 takes this information into account when determining the order of access. Since the arbiter "knows" that a write access only lasts one bus cycle, the arbiter 7 determines the more favorable order of accesses illustrated in Table 2.

TABLE 2

| | Cycle | | | | | | | | |
|---|---|---|---|---|---|---|---|---|---|
| | 1 | 2 | 3 | 4 | 5 | 6 | 7 | 8 | 9 |
| M-1 | | Read1 S-1 | Read1 S-1 | Read1 S-1 | Read1 S-1 | | | | |
| M-2 | Write1 S-2 | Write2 S-2 | Write2 S-2 | Write2 S-2 | Write2 S-2 | | | | |
| S-1 | | Read1 | Read1 | Read1 | | | | | |
| S-2 | Write1 | Write1 | Write1 | | Write2 | Write2 | Write2 | | |
| Bus | M-2 | M-1 | M-1 | M-1 | M-2 | | | | |

With the order of access determined here, the first write access of the second master 4 to the second slave 6 is preferred contrary to the priority of the first master 3. The bus 2 is occupied for this write access for one cycle by the second master M-2. With the next bus clock, i.e. cycle 2, the first master 3 starts its read access to the first slave 5. The bus is thus occupied for three cycles, i.e. cycles 2 to 4, by the first master 3. The arbiter 7 may grant the second master 4 the access to the bus 2 when the bus is free again and the second slave 6 has internally processed the first write access. Thus, the second master 4 starts the second write access to the second slave 6 in cycle 5. Since only one cycle is required for this write access on the bus 2, the masters have processed the planned accesses after 5 bus cycles already.

By using the new method, the bus 2 is better utilized, on the one hand, and the masters 3, 4 all in all have to wait a shorter time, on the other hand. For the processing of the planned accesses less time is thus required.

Figure 2:
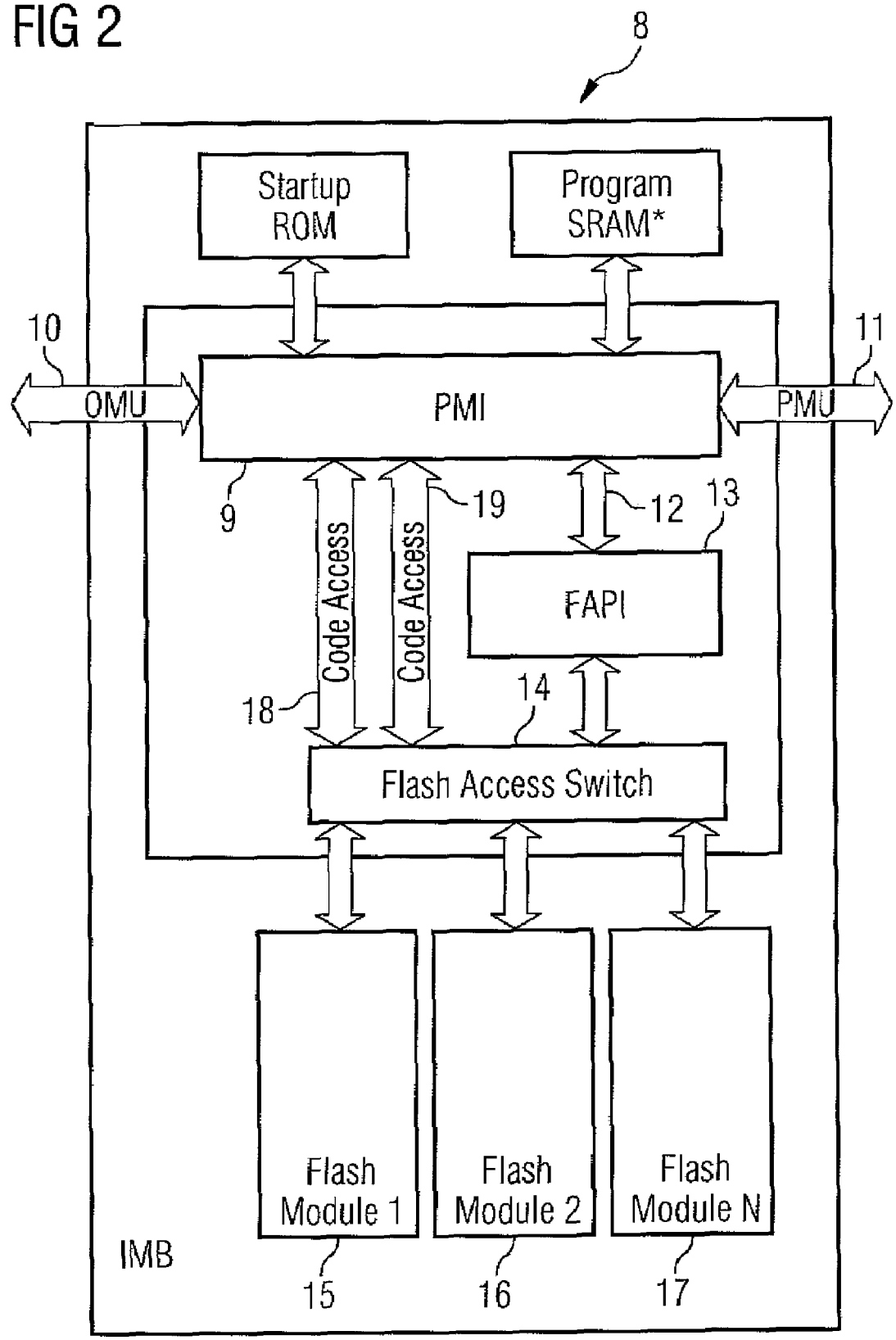
FIG. 2 illustrates a simplified block diagram of a master-slave system with a switch.

FIG. 2 illustrates an Instruction Memory Block (IMB) 8 as a section from a block diagram of a microcontroller. Number 9 designates a Program Memory Interface (PMI) that reads, on starting of the microcontroller, first of all a start instruction sequence from a ROM memory and subsequently an executable program from an SRAM memory. The logic of the arbiter is mapped in the PMI 9, so that the PMI performs the function of the arbiter.

The PMI is, via the connection 10, connected with a—not illustrated—Data Management Unit (DMU), via the connection 11 with a—not illustrated—Program Management Unit (PMU), and via the connection 12 with a Flash Application Programming Interface 13 (FAPI).

DMU, PMU and FAPI each act as masters that are adapted to actively access a Flash Access Switch 14. Via the Flash Access Switch 14, code and data accesses can simultaneously be performed to a first memory module "Flash Module 1" 15, a second memory module "Flash Module 2" 16, and a third memory module "Flash Module N" 17, wherein one memory module at a time can be accessed in reading or writing either with a code or a data access.

The memory modules 15, 16, and 17 act here as slaves which the masters, i.e. here the DMU and the PMU and the FAPI 13, can access via the Flash Access Switch 14. To this end, the FAPI 13 is directly connected with the Flash Access Switch 14, the accesses to the switch 14 of the DMU and the PMU are transmitted by the PMI 9 via the connections 18 and 19 to the Flash Access Switch 14.

The access to a memory module 15, 16, or 17 is controlled via a respective busy signal that is set by a memory module as long as it performs an action, i.e. is still busy performing an access.

For read accesses to a memory module there is, however, an acceleration for low system cycle frequencies. The arbiter may permit that a master sends a read access to a memory module when a previously started read access is still being processed by the same memory module. This, however, only applies for directly successive read accesses. The respective memory module 15, 16, or 17 accepts the second read access. Internally, however, the memory module processes the read accesses sequentially, so that the second read instruction is executed subsequent to the first one.

If a memory module performs an access of a different kind of access, i.e. if, for instance, a master accesses the memory module in writing, the arbiter has to observe the busy signal of the memory module and may permit an access to the respective memory module only if the busy signal of the memory module is no longer set. The sending of a second access request to a memory module is thus only admissible with directly successive read accesses.

For optimizing the accesses to the memory modules 15, 16, and 17, the masters, i.e. the DMU, the PMU, and the FAPI 13 do not only communicate to the PMI 9 that integrates the function of the arbiter that an access to the switch is required. Rather, each master now also communicates to the PMI 9 the information about the kind of the desired access, i.e., for instance, whether it is a read or a write access, and/or the target of the desired access, i.e. which slave 15, 16, or 17 the master wants to access.

The arbiter logic in the PMI 9 evaluates this information for each of the slaves 15, 16, or 17 and for the current access request, and stores the information to be able to access it for the next decision about an access.

The information of the masters about the kind and the target of a desired access thus make it possible that the PMI 9 permits two—then temporally parallel—read accesses to a memory module, i.e. a slave, at a time.

Without this information about the kind and the target of an access, the PMI 9 would not be able to examine whether the access that is currently requested for a slave and the access performed before are each read accesses, so that one access to a memory module would have to be prevented at any rate until the busy signal of the memory module is no longer set.

The logic of the arbiter—here integrated in the PMI—is mapped as a finite state machine in the instant embodiment. Since the accesses to the slaves 15, 16, and 17, i.e. the memory modules, may take place independently of each other, one respective finite state machine is provide for every memory module.

Such a finite state machine may assume six states that will be described for one memory module in the following.

In the first state, "NO_ACCESS", no master accesses the memory module. The memory module has not set the busy signal, so that an access to the memory module can immediately be permitted independently of the kind of access. If two masters should compete for the access, i.e. simultaneously request an access, the order of accesses is determined in accordance with the priority rules.

The state machine assumes the second state, "NO_ACCESS_AFTER_FLASH_READ", if the last access to the memory module was a read access, i.e. a code or data read access. Although the read access is terminated, the busy signal of the memory module is—for internal reasons of the memory module—still set. In this state an access request for a read access to the memory module may be permitted although the busy signal is still set.

In the third state, "FAPI_DATA_SFR_ACCESS", access to the memory module is permitted to the FAPI 13. In this state the FAPI accesses specific registers, Special Function Registers (SFR). A further access to the memory module is only admissible if the busy signal of the memory module is no longer set. In this state, a simultaneous reading access to the memory module is not admissible.

In the fourth state, "DMU_SFR_ACCESS", the DMU is granted an exclusive access to the memory module which also accesses Special Function Registers (SFR). In analogy to the third state, a further access to the memory module is only permitted if the busy signal of the memory module is no longer set.

The state machine assumes the fifth state, "DMU_DATA_ACCESS", when the DMU accesses the memory module in reading, i.e. with a data read access. In this state an immediate second read access to the memory module is admissible, so that it need not be waited until the busy signal is reset. Access requests of other kinds, i.e. requests for write accesses, are accepted, and permitted in the case of several requests by taking into account the priorities of the masters if the busy signal is no longer set.

Likewise, an immediate reading access is permitted in the sixth state, "PMU_CODE_ACCESS". In this state the PMU accesses the memory module in reading, so that a further reading access to the memory module can be permitted without the resetting of the busy signal having to be waited for. Access requests of other kinds, i.e., for instance, in writing, are permitted in analogy to the kind of treatment in the fifth state.

With such a finite state machine, the desired behavior of the arbiter can thus be mapped.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for operating a bus, at least two masters, at least one slave, and an arbiter, wherein the at least two masters and the at least one slave are connected with one another via the bus, the method comprising:

determining by the arbiter an order in which the at least two masters access the bus based on at least one meta information about at least one access, the meta information and an access request communicated to the arbiter directly from a respective master via a path separate from the bus.

2. The method of claim 1, comprising storing the meta information by the arbiter.

3. The method of claim 1, comprising wherein the meta information describes the target of the access.

4. The method of claim 1, comprising wherein the meta information describes the kind of access.

5. The method of claim 4, comprising wherein the kind of an access comprises same as read or write or control access.

6. The method of claim 1, comprising assigning each master a priority for an access to the bus.

7. The method of claim 1, comprising preferring an access on the bus lasting for a shorter time to an access lasting for a longer time.

8. The method of claim 1, comprising adapting the arbiter to assume a finite number of different states.

9. The method of claim 2, comprising taking into account at least one stored meta information about a previous access.

10. The method of claim 7, comprising assigning the access on the bus lasting for the shorter time to a master of low access priority, and the access lasting for a longer time to a master of higher access priority.

11. A semiconductor device comprising:
- at least one transmission channel for transmitting data, wherein the transmission channel directly connects at least two masters and one slave with one another; and
- an arbiter for determining an order of accesses to the transmission channel by the at least two masters, comprising wherein the masters are directly connected with the arbiter for transmitting meta information and an access request of a planned access by a line separate from the at least one transmission channel.

12. The semiconductor device of claim 11, wherein the semiconductor device comprises a memory for storing at least one meta information about at least one access.

13. The semiconductor device of claim 11, comprising wherein the semiconductor device is an integral component of a microcontroller.

14. A bus system comprising:
- a transmission channel;
- at least two masters and at least one slave, in communication with each other via the transmission channel; and
- an arbiter in direct communication with the at least two masters via a line separate from the transmission channel and configured to determine an order in which the at least two masters access the transmission channel using at least one meta information about at least one access when determining the order of accesses, the at least one meta information and an access request communicated to the arbiter from one of the at least two masters via the separate line.

15. The system of claim 14, comprising where the arbiter is configured to store the meta information.

16. The system of claim 14, comprising wherein the meta information describes the target of the access.

17. The system of claim 14, comprising wherein the meta information describes the kind of access.

18. The system of claim 14, comprising the arbiter is configured to assign each master a priority for an access to a transmission channel, where an access on the transmission channel lasting for a shorter time is preferred to an access lasting for a longer time.

19. The system of claim 18, comprising assigning the access on the transmission channel lasting for the shorter time to a master of low access priority, and the access lasting for a longer time to a master of higher access priority.

20. A bus system comprising:
- a transmission channel;
- at least two masters and at least one slave, in direct communication with each other via the transmission channel; and
- means for providing an arbiter in direct communication with the at least two masters via a line separate from the transmission channel and configured to determine an order in which the at least two masters access the transmission channel using at least one meta information and an access request about at least one access communicated to the arbiter via the separate line by one of the at least two masters when determining the order of accesses by the at least two masters.

* * * * *